United States Patent
Zhu et al.

(10) Patent No.: US 8,047,318 B2
(45) Date of Patent: Nov. 1, 2011

(54) COOLING SYSTEM FOR A VEHICLE BATTERY

(75) Inventors: Douglas Zhu, Chandler, AZ (US);
Shailesh Kozarekar, Novi, MI (US);
David Patel, Canton, MI (US); Michael Wallis, Belleville, MI (US); Eugene Cox, Southgate, MI (US); Stephen Lepper, Ann Arbor, MI (US); Daniel Huang, Cerritos, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1250 days.

(21) Appl. No.: 11/693,843

(22) Filed: Mar. 30, 2007

(65) Prior Publication Data

US 2008/0236181 A1    Oct. 2, 2008

(51) Int. Cl.
*B60K 11/08* (2006.01)

(52) U.S. Cl. ........ 180/68.2; 180/68.4; 62/186; 62/259.2

(58) Field of Classification Search ................. 180/68.1, 180/68.2, 68.3, 68.4, 68.5, 68.6; 62/186, 62/244, 259.2
See application file for complete search history.

(56) References Cited

U.S. PATENT DOCUMENTS

| | | | |
|---|---|---|---|
| 5,490,572 A | 2/1996 | Tajiri et al. | |
| 5,937,664 A * | 8/1999 | Matsuno et al. | 62/259.2 |
| 6,094,927 A | 8/2000 | Anazawa et al. | |
| 6,220,383 B1 * | 4/2001 | Muraki et al. | 180/68.5 |
| 6,541,151 B2 * | 4/2003 | Minamiura et al. | 429/98 |
| 6,750,630 B2 | 6/2004 | Inoue et al. | |
| 7,017,361 B2 | 3/2006 | Kwon | |
| 7,025,159 B2 | 4/2006 | Smith et al. | |
| 7,152,417 B2 * | 12/2006 | Morishita et al. | 62/186 |
| 7,654,351 B2 * | 2/2010 | Koike et al. | 180/68.5 |
| 2003/0080714 A1 | 5/2003 | Inoue et al. | |
| 2005/0056035 A1 | 3/2005 | Smith | |
| 2006/0080986 A1 * | 4/2006 | Inoue | 62/259.2 |

* cited by examiner

*Primary Examiner* — John Walters
(74) *Attorney, Agent, or Firm* — David B. Kelley; Brooks Kushman P.C.

(57) ABSTRACT

Air is cooled by a heat exchanger of a vehicle. The cooled air is directed to a cabin and/or battery of the vehicle. Ports in the cooling path direct the cooled air to the cabin and/or battery.

17 Claims, 6 Drawing Sheets

COOLING SYSTEM FOR A VEHICLE BATTERY

BACKGROUND OF THE INVENTION

1. Field of the Invention

The invention relates to cooling systems for vehicle batteries.

2. Discussion

A battery may generate heat during charging and discharging, and may need to be cooled for performance, fuel economy, and battery life reasons.

A battery in an alternatively powered vehicle may be cooled by a separate heat exchanger next to the battery. Packaging such a unit, however, may be expensive and require a large space to accommodate the separate heat exchanger, shut off valves, and refrigerant tubing often associated with such a unit.

Other systems may use cabin air to cool the battery, but the effectiveness of such systems may be reduced when the cabin air is hot. In addition, air used for battery cooling may impact cabin comfort via leakage, temperature, humidity, and noise.

SUMMARY

Embodiments of the invention may take the form of a system for cooling a battery. The system includes a heat exchanger to cool air, a blower in fluid communication with the heat exchanger to blow the air across the heat exchanger, and a cabin air supply duct to channel the cooled air to the cabin. The system also includes a battery air supply duct to channel the cooled air to the battery and a distribution gate in fluid communication with the heat exchanger and the ducts to receive the cooled air and to direct the cooled air to at least one of the cabin air supply duct and the battery air supply duct.

Embodiments of the invention may take the form of a method for cooling a cabin and a battery. The method includes receiving at least one of cabin air and outside air, blowing the received air over a heat exchanger to cool the air, and directing the cooled air into the cabin and the battery.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
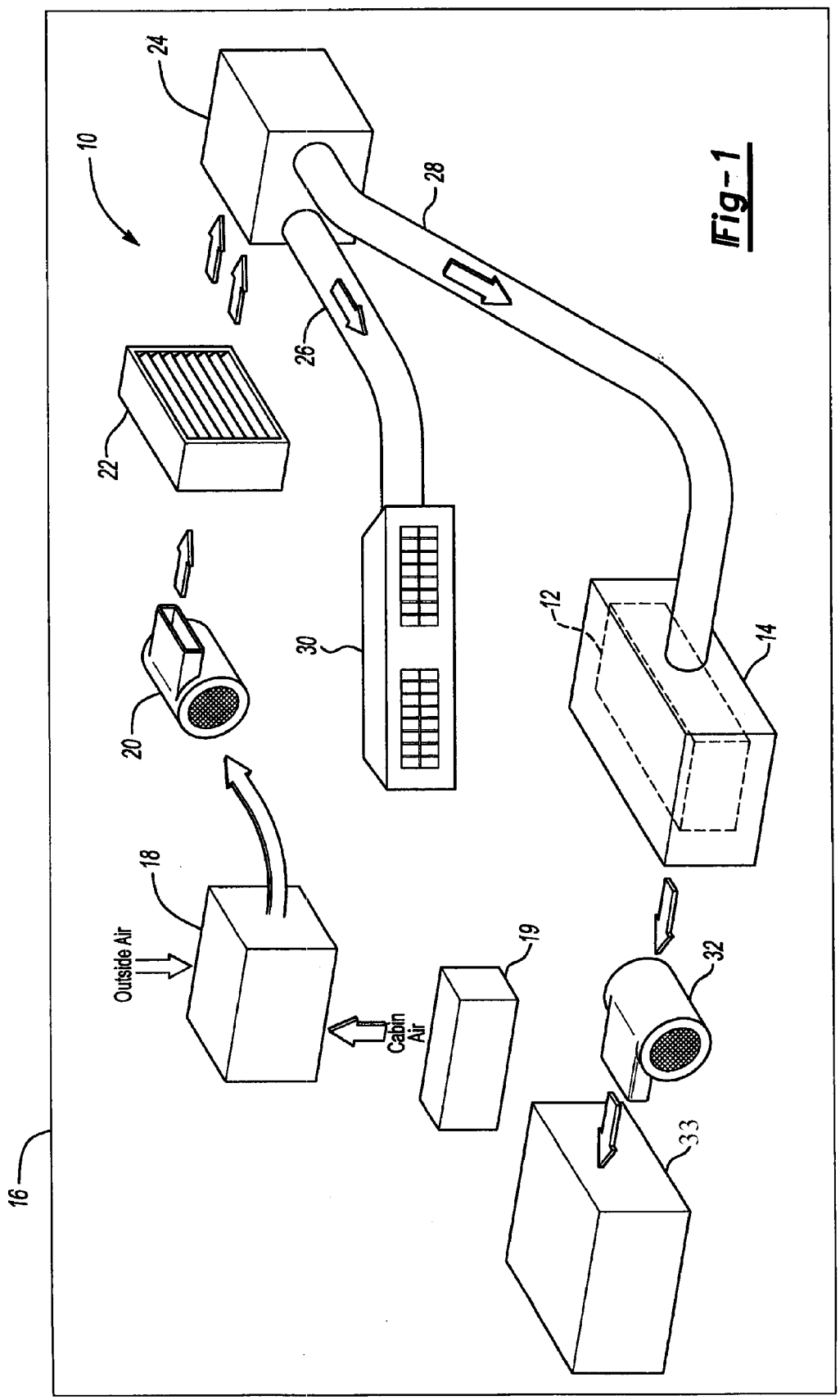
FIG. 1 is an illustration of a battery cooling system in accordance with an embodiment of the invention and shows the pathway of air, as indicated by arrow, from an entry port, through a multi port, and to either or both of the cabin and battery.

Some embodiments of the invention include an air handling unit having two partitions, one to the cabin and another to the traction battery. The air distribution is accomplished by an air distribution door that can be adjusted based on the battery and cabin needs. The door may be motor controlled and located either in the HVAC system or in the battery system.

The air to the battery may be directed to the battery system through a dedicated duct or ducts. Either the same blower or a second dedicated air blower may be used for the cabin climate control and battery system. If a second blower is used, a fixed air distribution door may be used instead of a motorized door. Similarly, either the heat exchanger or a separate heat exchanger may be used for the cabin climate control and battery system.

The heat exchanger may include an air heater, e.g., electrical heater or waste heat from an engine, evaporator core, and blend door to mix the cold air and warm air to achieve a desired air temperature. If two or more separate heat generators are used, they may be controlled independently.

An advantage is that any refrigerant tubes do not have to go through the body when the battery is in the rear portion of the vehicle. Instead, an air duct may be used to direct the air to the rear system as high pressure refrigerant tubes may be more expensive than air ducts.

Some embodiments of the invention include a single heat exchanger. When both the cabin and the battery need cooling, the cooled air from the heat exchanger may cool both the cabin and battery. When the first system, e.g., battery, requires cooling but the second system, e.g., cabin, requires warming, the compressor may be turned on, but the second system may be mixed with warm air. Since this may impact fuel economy, the battery cooling may give priority to the cabin warming. This can be done either by turning the battery fan off (without cooling), or cooling the battery with relatively warm air. In some cases, cooling the battery with warm air is still beneficial because the warm air is generally cooler than the battery.

In some embodiments of the invention, the battery may also require warm air when the battery is exposed to low temperatures. In these situations, the cabin may also require warm air. The balance over cabin climate and battery thermal control may be optimized.

Some embodiments of the invention include ducts routed to a battery in a rear portion of the vehicle, e.g., a duct routed underneath the carpet. In some vehicles, there are air ducts to the second row seat foot locations for the second row seat climate control. These ducts may be extended to the battery system thermal control. If the ducts to the second row seats are needed for occupant comfort, separate air ducts may then needed. These ducts may be routed side-by-side with the existing ducts, or new ducts may be routed elsewhere, such as by the sides of the vehicle, through the central console, or between the headliner and the ceiling. The air ducts may be insulated to reduce the heat transfer to the cabin and the noises emitted to the cabin.

In some embodiments of the invention, the battery may be cooled with cabin air when the air conditioning for the cabin is turned off. In this case, more air may be needed since the air temperature may be relatively warm. The cooled air directly from the cabin may enable the air flow to be larger. In this case, a separate door may be needed in the battery system. This may also be necessary if the duct cross-section is small and designed for cold air only due to limitations of the package space.

The battery may be cooled with outside air when the air conditioning is turned off and it is undesirable to use the cabin air. In this case, a three-way door may be needed to switch the air among HVAC, cabin, and outside sources.

FIG. 1 is an illustration of battery cooling system 10. Entry duct 18 receives air from outside vehicle 16, cabin air from vehicle cabin 19, or some combination thereof. Entry duct 18 directs this air to fan 20. Fan 20 then directs the air over heat exchanger 22 to cool it. The cooled air exits heat exchanger 22 and enters multi-port duct 24. As described below, multi-port duct may direct air into either or both of channels 26, 28. Channel 26 fluidly connects multi-port duct 24 with cabin air registers 30. Channel 28 fluidly connects battery chamber 14 with multi-port duct 24. Air cooled by heat exchanger 22 may thus be used to cool one or both of battery 12 and vehicle cabin 19. Fan 32 pulls air from within battery chamber 14 and directs it into vehicle trunk 33.

Figure 2A:
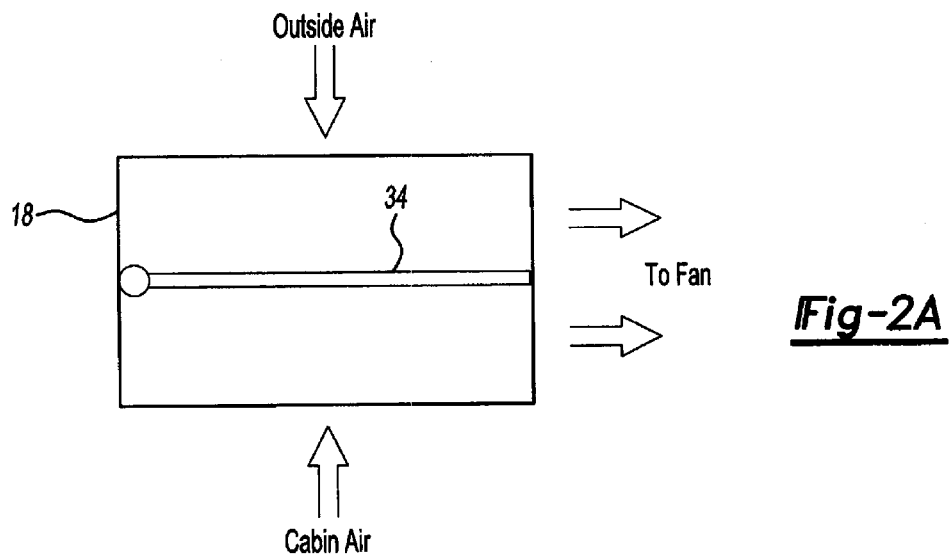
FIG. 2A is a block diagram of the entry port of FIG. 1 and shows outside and cabin air entering the port.
Figure 2B:
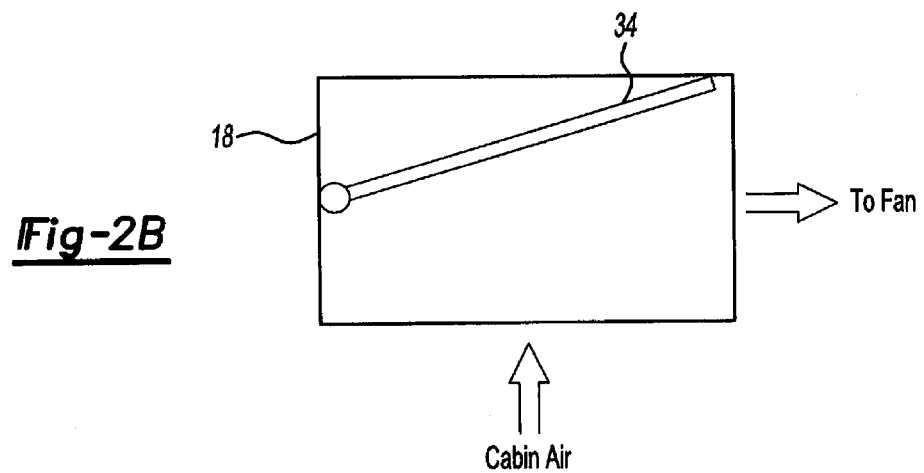
FIG. 2B is another block diagram of the entry port of FIG. 1 and shows cabin air entering the port.
Figure 2C:
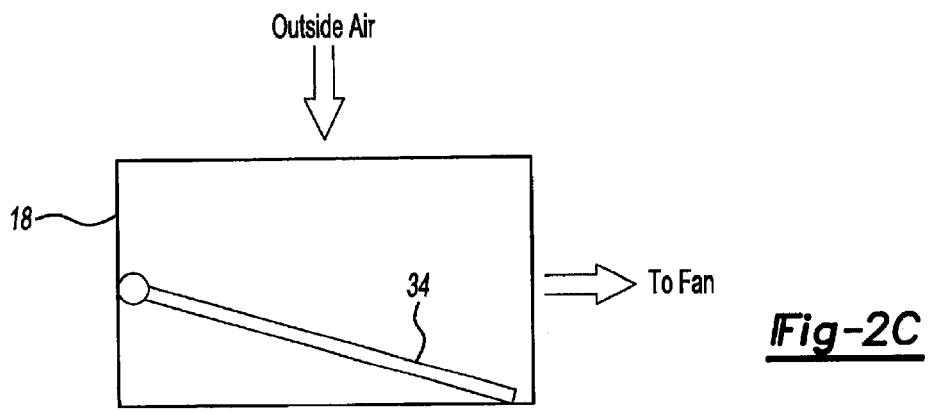
FIG. 2C is still another block diagram of the entry port of FIG. 1 and shows outside air entering the port.

FIGS. 2A-2C are block diagrams of entry duct 18. Entry duct 18 includes gate 34. Gate 34 may be moved between three positions. In FIG. 2A, gate 34 is positioned such that entry duct 18 may receive outside air and cabin air and direct it to fan 20. In FIG. 2B, gate 34 is positioned such that entry duct 18 may receive cabin air and direct it to fan 20. In FIG. 2C, gate 34 is positioned such that entry duct 18 may receive outside air and direct it to fan 20.

Figure 3A:
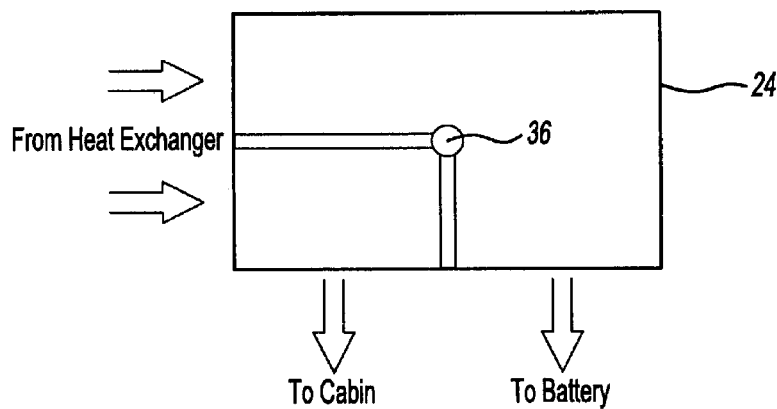
FIG. 3A is a block diagram of the multi port of FIG. 1 and shows air exiting the port to the cabin and battery.
Figure 3B:
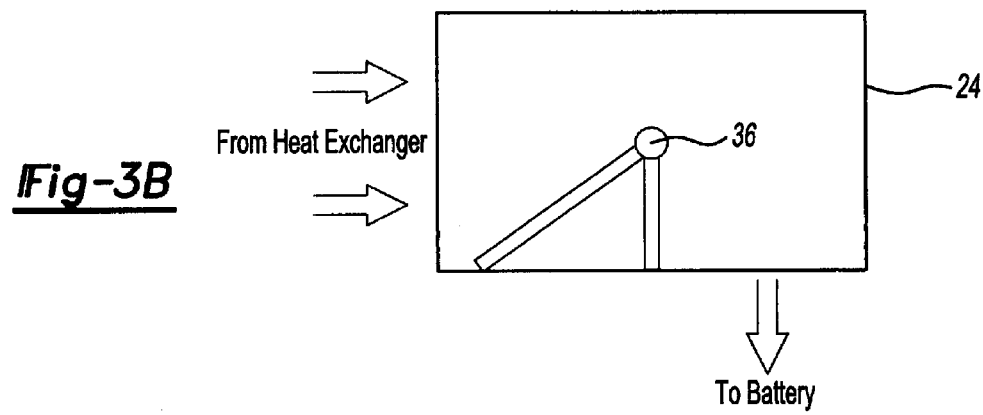
FIG. 3B is another block diagram of the multi port of FIG. 1 and shows air exiting the port to the battery.
Figure 3C:
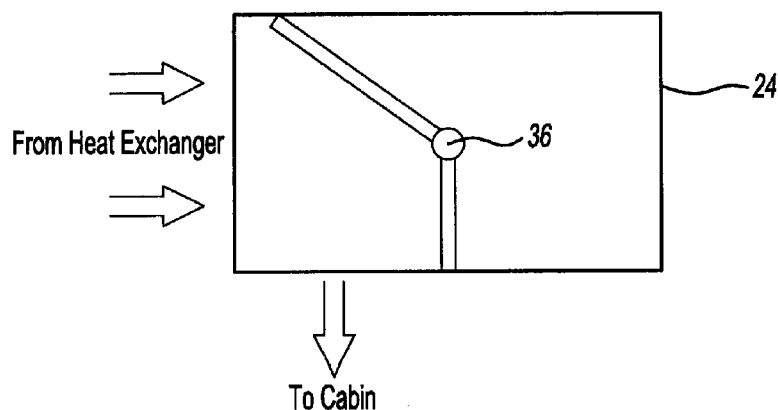
FIG. 3C is still another block diagram of the multi port of FIG. 1 and shows air exiting the port to the cabin.

FIGS. 3A-3C are block diagrams of multi-port duct 24. Multi-port duct 24 includes gate 36. Gate 36 is movable between three positions to permit multi-port duct 24 to direct air from heat exchanger 22 to cabin register 30, battery chamber 14, or both. In FIG. 3A, gate 36 is positioned such that multi-port duct 24 directs the cooled air to channels 26, 28. In FIG. 3B, channel 36 is positioned such that multi-port duct 24 directs air to channel 28. In FIG. 3C, gate 36 is positioned such that multi-port duct 24 directs air to channel 26.

Gates 34, 36 are controlled via motors and linkages. A controller (not shown) interprets commands from an occupant, e.g., the press of a button, or from a cooling system control algorithm and positions gates 34, 36 appropriately.

Figure 4:
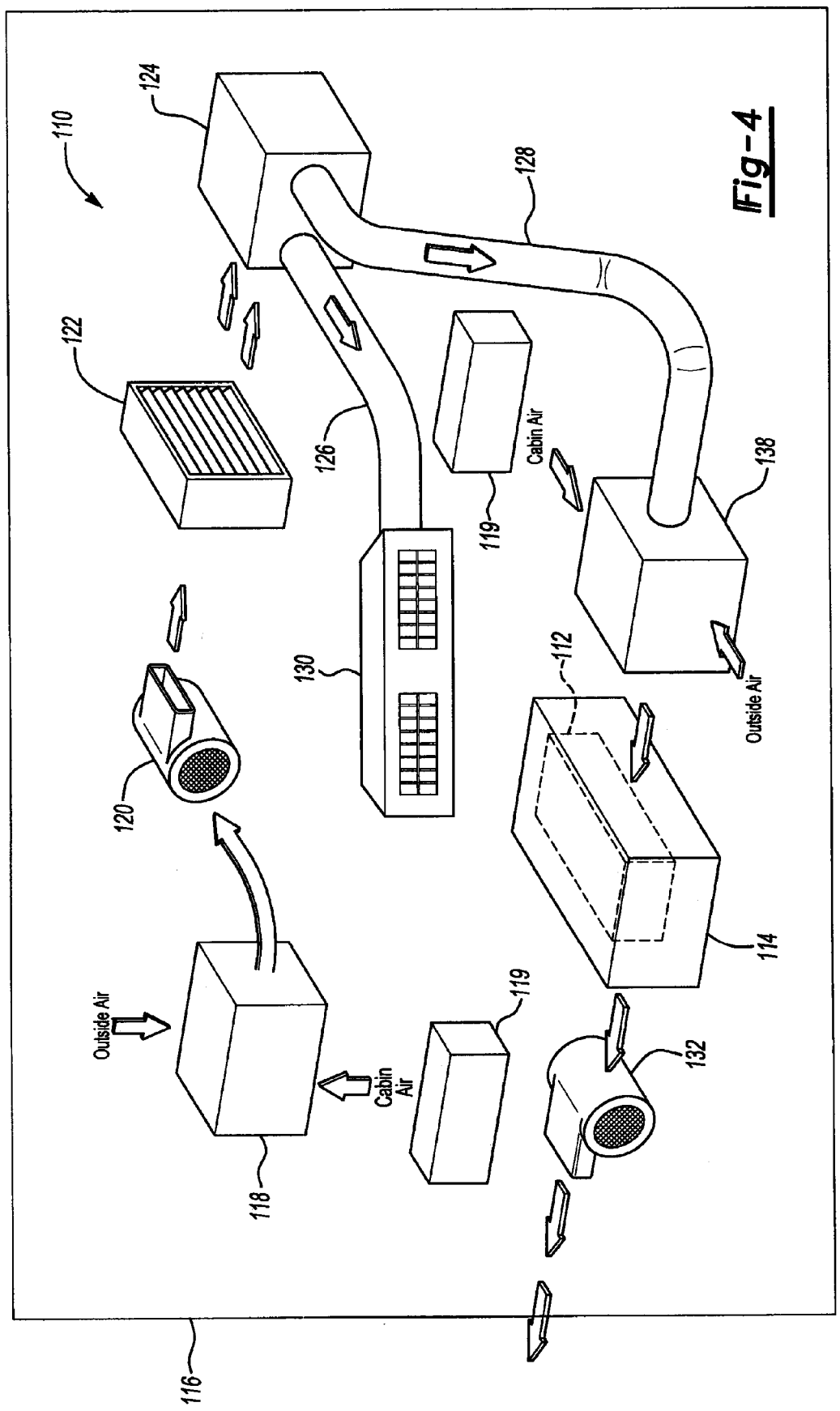
FIG. 4 is an illustration of a battery cooling system in accordance with an alternative embodiment of the invention and shows the pathway of air, as indicated by arrow, from an entry port, through a multi port, and to either or both of the cabin and battery.

FIG. 4 is an illustration of an alternative battery cooling system 110. Numbered elements differing by 100 have similar descriptions, e.g., entry ducts 18, 118, multi-port ducts 24, 124, channels 26, 126, cabin air registers 30, 130, and heat exchangers 22, 122, etc. have similar descriptions. Multi-port entry duct 138 may receive cabin air from vehicle cabin 119, outside air, cooled air from channel 128, or any combination thereof and direct it to battery chamber 114.

Figure 5A:
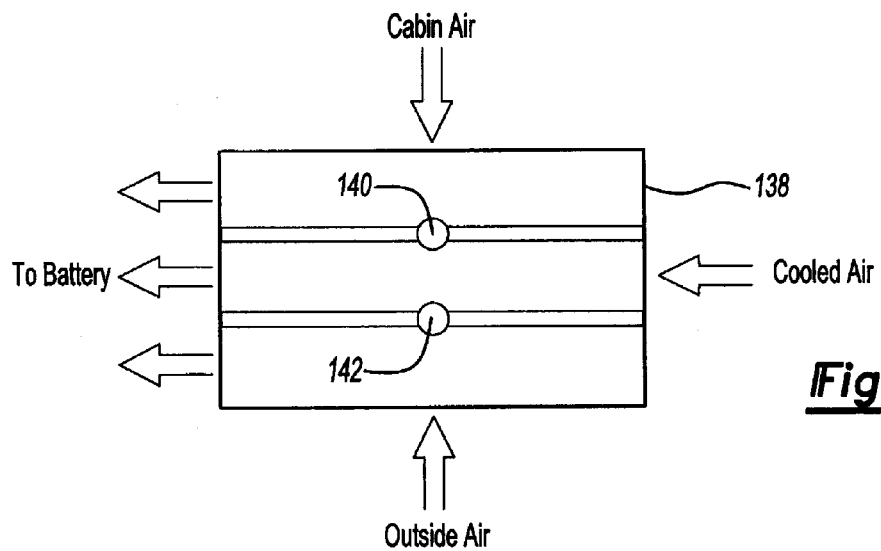
FIG. 5A is a block diagram of the duct of FIG. 4 and shows cabin air, cooled air, and outside air entering the duct.
Figure 5B:
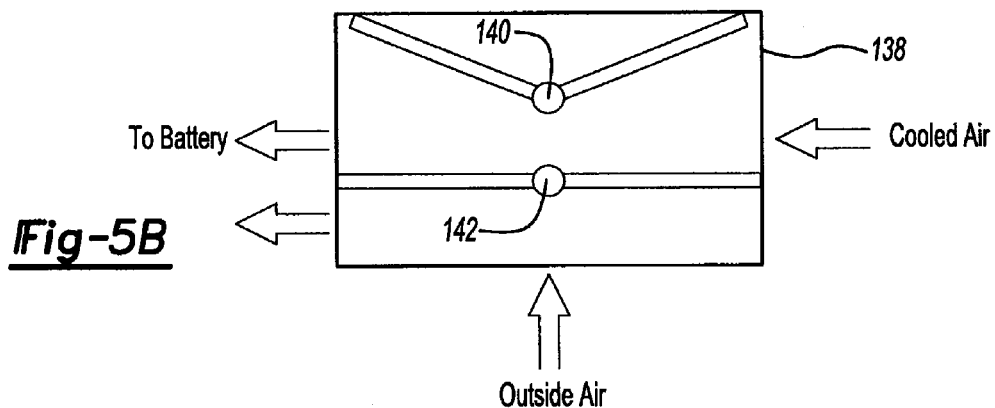
FIG. 5B is another block diagram of the duct of FIG. 4 and shows cooled air and outside air entering the duct.
Figure 5C:
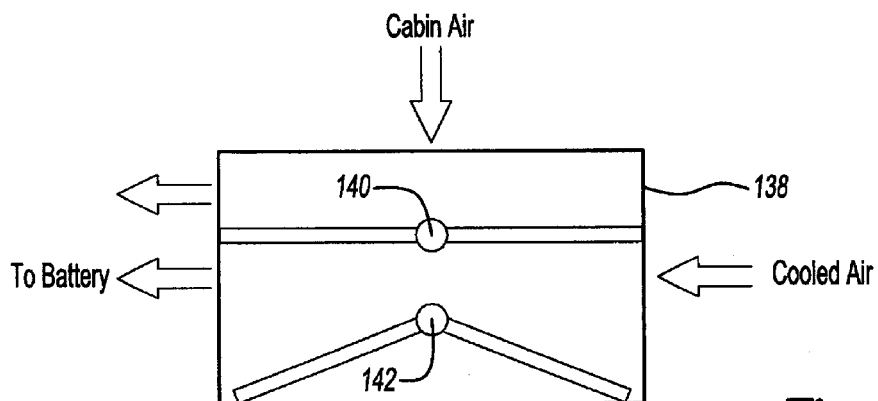
FIG. 5C is another block diagram of the duct of FIG. 4 and shows cabin air and cooled air entering the duct.
Figure 5D:
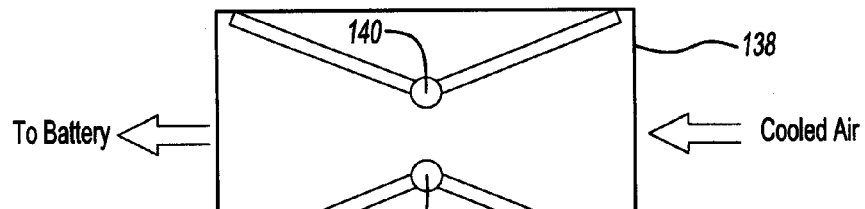
FIG. 5D is another block diagram of the duct of FIG. 4 and shows cooled air entering the duct.
Figure 5E:
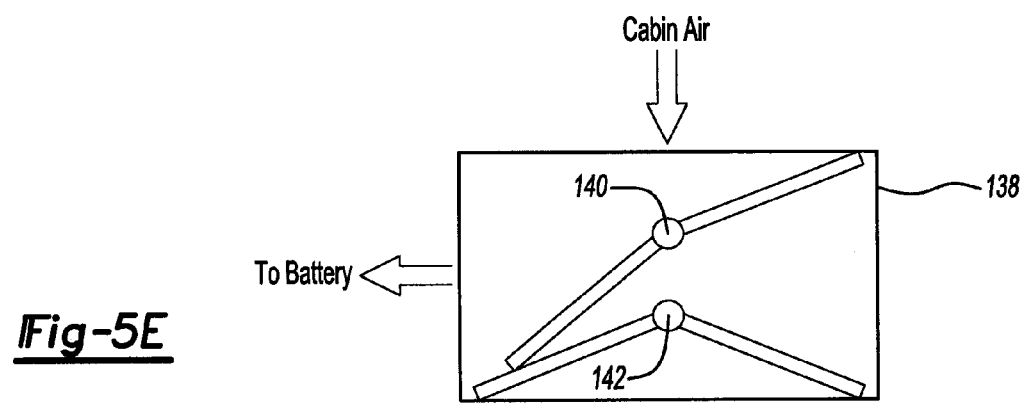
FIG. 5E is still another block diagram of the duct of FIG. 4 and shows cabin air entering the duct.
Figure 5F:
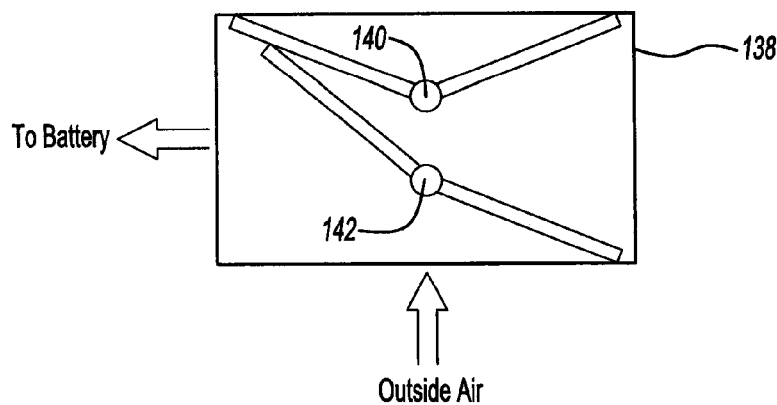
FIG. 5F is still yet another block diagram of the duct of FIG. 4 and shows outside air entering the duct.

FIGS. 5A-5F are block diagrams of multi-port entry duct 138. Multi-port entry duct 138 includes gates 140, 142. In FIG. 5A, gates 140, 142 are positioned such that multi-port entry duct 138 receives cabin air, outside air, and cooled air and directs it to battery chamber 114. In FIG. 5B, gates 140, 142 are positioned such that multi-port entry duct 138 receives outside air and cooled air and directs it to battery chamber 114. In FIG. 5C, gates 140, 142 are positioned such that multi-port entry duct 138 receives cabin air and cooled air and directs it to battery chamber 114. In FIG. 5D, gates 140, 142 are positioned such that multi-port entry duct 138 receives cooled air and directs it to battery chamber 114. In FIG. 5E, gates 140, 142 are positioned such that multi-port entry duct 138 receives cabin air and directs it to battery chamber 114. In FIG. 5F, gates 140, 142 are positioned such that multiport entry duct 138 receives outside air and directs it to battery chamber 114.

Gates 140, 142 are controlled via motors and linkages. A controller (not shown) interprets commands from an occupant, e.g., the press of a button, or from a cooling system control algorithm and positions gates 140, 142 appropriately.

Multi-port entry duct 138 allows a driver of vehicle 116 to supplement the cooled air with cabin air and/or outside air as shown in FIGS. 5A-5C. Multi-port entry duct 138 in combination with fan 132 permits a driver of vehicle 116 to cool battery 112 with either cabin air, as shown in FIG. 5E, or outside air, as shown in FIG. 5F. In such circumstances, fan 132 is used to draw cabin air or outside air through battery chamber 114 and direct it to outside the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for cooling a battery of a hybrid electric vehicle including a cabin and a battery chamber, the battery being disposed within the battery chamber and configured to provide power to move the vehicle, the system comprising:
    a heat exchanger to cool air;
    a blower in fluid communication with the heat exchanger to blow the air across the heat exchanger;
    a cabin air supply duct to channel the cooled air to the cabin;
    a battery air supply duct to channel the cooled air to the battery chamber thereby cooling the battery; and
    a distribution gate, including a door moveable between first, second, and third positions, in fluid communication with the heat exchanger and the ducts to receive the cooled air and to direct the cooled air to at least one of the cabin air supply duct and the battery air supply duct.

2. The system of claim 1 wherein the distribution gate directs the cooled air solely to the cabin air supply duct if the door is in the first position, wherein the distribution gate directs the cooled air to the cabin air supply duct and the battery air supply duct if the door is in the second position, and wherein the distribution gate directs the cooled air solely to the battery air supply duct if the door is in the third position.

3. The system of claim 1 wherein the distribution gate includes a door moveable between first and second positions.

4. The system of claim 3 wherein the distribution gate directs the cooled air solely to one of the ducts if the door is in the first position and wherein the distribution gate directs the cooled air to the cabin air supply duct and the battery air supply duct if the door is in the second position.

5. The system of claim 1 further comprising an input gate in fluid communication with the blower to receive at least one of outside air and cabin air and to provide the received air to the blower.

6. The system of claim 5 wherein the input gate includes a door moveable between first, second, and third positions.

7. The system of claim 6 wherein the input gate receives and provides outside air to the blower if the door is in the first position, wherein the input gate receives and provides outside air and cabin air to the blower if the door is in the second position, and wherein the input gate receives and provides cabin air to the blower if the door is in the third position.

8. The system of claim 5 wherein the input gate includes a door moveable between first and second positions.

9. The system of claim 8 wherein the input gate receives and provides one of outside air and cabin air to the blower if the door is in the first position and wherein the input gate receives and provides outside air and cabin air to the blower if the door is in the second position.

10. The system of claim 1 further comprising a source gate, in fluid communication with the battery air supply duct and the battery, to receive at least one of outside air, cabin air, and the cooled air from the battery air supply duct and to direct the received air to the battery chamber.

11. The system of claim 10 wherein the source gate includes another door moveable between first, second, and third positions.

12. The system of claim 11 wherein the source gate receives and directs the outside air and the cooled air to the battery chamber if the another door is in the first position, wherein the source gate receives and directs the cabin air and the cooled air to the battery chamber if the another door is in the second position, and wherein the source gate receives and directs the cooled air to the battery chamber if the another door is in the third position.

13. The system of claim 10 wherein the source gate includes another door moveable between first and second positions.

14. The system of claim 13 wherein the source gate receives and directs the outside air and the cooled air to the battery chamber if the another door is in the first position and wherein the source gate receives and directs the cabin air and the cooled air to the battery chamber if the another door is in the second position.

15. The system of claim 1 further comprising an air puller in fluid communication with the battery to pull air from the battery chamber and to direct it away from the battery chamber.

16. The system of claim 15 wherein the vehicle includes a trunk and wherein the air puller directs the battery chamber air into the trunk.

17. The system of claim 15 wherein the air puller directs the battery chamber air outside the vehicle.

* * * * *